United States Patent
McGovern et al.

(10) Patent No.: US 12,039,601 B2
(45) Date of Patent: *Jul. 16, 2024

(54) DISTRIBUTED TRADING NETWORK AND INTERFACE

(71) Applicant: CFPH, LLC, New York, NY (US)

(72) Inventors: Peter McGovern, North Arlington, NJ (US); Kevin Foley, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,447

(22) Filed: Apr. 6, 2023

(65) Prior Publication Data
US 2023/0245227 A1  Aug. 3, 2023

Related U.S. Application Data

(63) Continuation of application No. 17/173,955, filed on Feb. 11, 2021, now Pat. No. 11,625,778, which is a
(Continued)

(51) Int. Cl.
*G06Q 40/04* (2012.01)
*G06Q 40/00* (2023.01)
*G06Q 40/06* (2012.01)

(52) U.S. Cl.
CPC .......... *G06Q 40/04* (2013.01); *G06Q 40/00* (2013.01); *G06Q 40/06* (2013.01)

(58) Field of Classification Search
CPC ......... G06Q 40/04; G06Q 40/00; G06Q 40/06
See application file for complete search history.

(56) References Cited

U.S. PATENT DOCUMENTS

| 7,752,116 B2 * | 7/2010 | Ascher .................. G06Q 40/00 705/37 |
| 8,131,633 B2 * | 3/2012 | Schlifstein ............ G06Q 40/04 705/37 |

(Continued)

FOREIGN PATENT DOCUMENTS

| EP | 2239701 A1 * | 10/2010 | ......... G06Q 10/0637 |
| WO | WO-2009015391 A2 * | 1/2009 | ......... G06Q 10/0637 |
| WO | WO-2009065026 A2 * | 5/2009 | ......... G06F 16/9538 |

OTHER PUBLICATIONS

Greenwish Associates: U.S treasury Trading: The Intersection of Liquidity Makers and Takers, Q4 2015, pp. 1-12 (Year: 2015).*
(Continued)

*Primary Examiner* — Bijendra K Shrestha

(57) ABSTRACT

A distributed trading platform comprising: a first participant system of a liquidity provider configured to determine a first order that is stored in a first order management system; a central system configured to determine a plurality of second orders based on the first order, an aggression level and market data; and a second participant system of a liquidity taker configured to determine that a contra order is stored in a second order management system, determine a single second order of the plurality of second orders that the liquidity taker is qualified to view based on a third quantity of the contra order, and populate a second trader interface with information soliciting submission of the contra order to the distributed trading platform for matching with the single second order.

13 Claims, 3 Drawing Sheets

Related U.S. Application Data continuation of application No. 16/180,959, filed on Nov. 5, 2018, now Pat. No. 10,922,752, which is a continuation of application No. 15/661,951, filed on Jul. 27, 2017, now Pat. No. 10,121,199.

(60) Provisional application No. 62/524,126, filed on Jun. 23, 2017.

(56) References Cited

U.S. PATENT DOCUMENTS

| | | | | |
|---|---|---|---|---|
| 8,200,570 | B2* | 6/2012 | Sinclair | G06Q 30/0601 |
| | | | | 705/37 |
| 8,296,221 | B1* | 10/2012 | Waelbroeck | G06Q 40/04 |
| | | | | 705/37 |
| 8,775,298 | B2* | 7/2014 | Waelbroeck | G06Q 40/04 |
| | | | | 705/37 |
| 2004/0210511 | A1* | 10/2004 | Waelbroeck | G06Q 40/04 |
| | | | | 705/37 |
| 2005/0108141 | A1* | 5/2005 | Farrell | G06Q 40/04 |
| | | | | 705/37 |
| 2007/0106546 | A1* | 5/2007 | Esau | G06Q 10/00 |
| | | | | 705/26.1 |
| 2007/0208654 | A1* | 9/2007 | Stearns | G06Q 40/04 |
| | | | | 705/37 |
| 2015/0317734 | A1* | 11/2015 | Foley | G06Q 40/04 |
| | | | | 705/37 |

OTHER PUBLICATIONS

Degryse et al.: Two Shades of opacity: Hidden Orders versus Dark Trading, Feb. 18, 2015, pp. 1-52 (Year: 2015).*

Christensen et al.: Prediction of Hidden Liquidity in the Limit Order Book of Globex Futures, Summer 2013, Journal of Trading, pp. 68-95 (Year: 2013).*

Choi et al.: Did Liquidity Providers Become Liquidity Seekers? Oct. 2013, Federal Reserve Bank of New York, pp. 1-45 (Year: 2013).*

* cited by examiner

DISTRIBUTED TRADING NETWORK AND INTERFACE

CROSS-REFERENCE TO RELATED APPLICATIONS

This application is a continuation of U.S. patent application Ser. No. 17/173,955 filed Feb. 11, 2021, which is a continuation of U.S. patent application Ser. No. 16/180,959 filed Nov. 5, 2018 (now U.S. Pat. No. 10,922,752 issued Feb. 16, 2021), which is a continuation of U.S. patent application Ser. No. 15/661,951 filed Jul. 27, 2017 (now U.S. Pat. No. 10,121,199 issued Nov. 6, 2018), which claims priority to U.S. Provisional Application No. 62/524,126 filed Jun. 23, 2017, which are hereby incorporated herein by reference in their entireties.

Various embodiments of the present invention may utilize one or more of the trading platforms, exchanges, order management systems ("OMS"), pricing algorithms, market mechanics, and other features of the following U.S. patents and applications: U.S. Pat. No. 8,566,213, issued Oct. 22, 2013; U.S. patent application Ser. No. 10/310,345 (U.S. Patent Publication No. 2004/0034591), U.S. patent application Ser. No. 12/477,549, U.S. patent application Ser. No. 12/470,431, U.S. patent application Ser. No. 12/135,479, U.S. patent application Ser. No. 12/113,602, and U.S. patent application Ser. No. 12/237,976. It should be understood that the features described herein may also be configured to operate within the trading systems described in U.S. patent application Ser. No. 12/477,549, filed Jun. 3, 2009, entitled "PRODUCTS AND PROCESSES FOR GENERATING A PLURALITY OF ORDERS," U.S. patent application Ser. No. 12/470,431, filed May 21, 2009, U.S. patent application Ser. No. 12/135,479, entitled "TRADING SYSTEM PRODUCTS AND PROCESSES", filed Jun. 9, 2008, U.S. patent application Ser. No. 12/113,602, filed May 1, 2008, entitled "ELECTRONIC SECURITIES MARKETPLACE HAVING INTEGRATION WITH ORDER MANAGEMENT SYSTEMS," U.S. patent application Ser. No. 12/237,976, filed Sep. 25, 2008, entitled "TRADING RELATED TO FUND COMPOSITIONS", U.S. patent application Ser. No. 12/113,642 filed May 1, 2008, U.S. patent application Ser. No. 12/257,499 filed Oct. 24, 2008, U.S. Ser. No. 13/888,352 filed May 6, 2013 (U.S. Patent Publication No. 2014/0229353), U.S. Ser. No. 13/844,779 filed Mar. 15, 2013. The disclosures of these applications, patents, and publications, and all other documents referenced in this patent application, are incorporated by reference herein in their entireties.

BACKGROUND

Various systems enable submission of trading orders that are shown to a plurality of contra parties. The orders may have different prices and quantities, and may be submitted so that a contra party does not know the identity of the trader submitting the order or request. For example, U.S. patent application Ser. No. 10/310,345 (U.S. Patent Publication No. 2004/0034591), which is hereby incorporated herein by reference, describes a system that sends anonymous trading messages from one party to a targeted group of contra-parties.

SUMMARY

Various embodiments are directed to generating a plurality of conditional orders for a trading product, e.g., at different quantities and prices, from a single order in an order management system. In some embodiments, information about a generated conditional order may be output to a qualifying contra party. For example, a contra party may be qualified to view information about one of the generated conditional orders based on one or more criteria, such as an identified contra interest of the contra party at a particular quantity of the trading product in a contra party OMS. In some embodiments, the generated conditional order having a quantity that matches the particular quantity may be displayed to the contra party. In this way, the contra party may only see the specific conditional order at a price corresponding to the contra party's relevant quantity. Some embodiments may interact with OMSes to reserve and/or firm orders generating an efficient, useable and fast distributed trading network and interface.

The following should be interpreted as embodiments and not claims.

A. A distributed trading platform comprising: a first participant system of a liquidity provider, comprising: a first computing device; a first network interface; and a first non-transitory medium having stored there a plurality of instructions that when executed by the first computing device cause the first participant system to: receive, in response to input into a first trader interface and through the first communication link, an aggression level for use in processing orders through the distributed trading platform; in response to receiving the aggression level, transmit the aggression level to a central system of the distributed trading platform; determine, by communicating through the first network link with a first order management system of the liquidity provider, a first order that is stored in the first order management system and that is identified for processing by the distributed trading platform, in which the first order is for a first side of a trade for a first quantity of a financial instrument; in response to determining the first order, transmit, through the first communication link, the first order to the central system; receive, through the first network link from the central system, a contra order, in which the contra order is for a second side of the trade for a third quantity of the financial instrument; in response to receiving the contra order, reserve, by communicating through the first network link with the first order management system, the third quantity of the financial instrument; and in response to reserving the third quantity of the financial instrument, transmit, through the first network link to the central system, an indication that the third quantity of the financial instrument is reserved; the central system of the distributed trading platform, comprising: a second computing device; a second network interface; and a second non-transitory medium having stored there a plurality of instructions that when executed by the second computing device cause the central system to: receive, through the second communication link, market data regarding the financial instrument; receive, through the second communication link from the first participant system, the aggression level; in response to receiving the aggression level, store the aggression level for use in determining prices; receive, through the second communication link from the first participant system, the first order; in response to receiving the first order, determine a plurality of second orders based on the first order, the aggression level and the market data, in which the plurality of second orders include a ladder of orders each with different quantities and different price deviations from a market price such that the price deviation from the market price increases in favor of the liquidity provider as the quantity increases, in which each order of the plurality of orders includes a respective minimum fill parameter and a respective maximum contra display parameter such that the ladder of orders includes no orders that have an overlapping range of minimum fill parameter and maximum contra display parameter; in response to determining the plurality of second orders, transmit the plurality of second orders to a plurality of participant systems of a plurality of liquidity takers; receive, through the second network link and from a second participant system of the plurality of participant systems of a liquidity taker of the plurality of liquidity takers, the contra order; in response to receiving the contra order, transmit the contra order, through the second network link to the first participant system; receive, through the second network link and from the first participant system, the indication that the third quantity of the financial instrument is reserved in the first order management system; and in response to receiving the indication that the third quantity of the financial instrument is reserved, facilitate execution of an exchange that fulfills at least a part of each of the contra order and a single second order of the plurality of second orders that the liquidity taker is qualified to view and; and a second participant system of the plurality of participant systems of a liquidity taker of the plurality of liquidity takers, comprising: a third computing device; a third network interface; and a third non-transitory medium having stored there a plurality of instructions that when executed by the third computing device cause the second participant system to: determine, by communicating through the third network link with a second order management system of the liquidity taker, that the contra order is stored in the second order management system, receive, through the third network link and from the central system, the plurality of second orders; in response to receiving the plurality of second orders, determine the single second order of the plurality of second orders that the liquidity taker is qualified to view based on third quantity of the contra order, in which the single second order includes the second order in the ladder of orders that has a minimum fill parameter equal to or below the third quantity and has a maximum contra display parameter equal to or greater than the third quantity; in response to determining the single second order, populate, through the third communication link, a second trader interface with information soliciting submission of the contra order to the distributed trading platform for matching with the single second order; receive, from the second trader interface through the third communication link, submission of the contra order to the distributed trading platform for matching with the single second order; and in response to receiving submission of the contra order, reserve, by communicating through the third network link with the second order management system, the contra order in the second order management system and transmit, through the third network link, the contra order to the central system.

The distributed trading platform of A, in which the aggression level includes a numerical identifier expressing a percentage of an expected market impact cost that the liquidity taker pays as a liquidity premium for the execution. The distributed trading platform of A, in which market impact cost is determined based on historical data and market volatility. The distributed trading platform of A, in which the first participant system and the first order management system securely store trading intentions of the liquidity provider. The distributed trading platform of A, in which the first participant system communicates with the first order management system through an API of the first order management system. The distributed trading platform of A, in which reserving the third quantity with the first order management system includes requesting that the first order management firm up sufficient liquidity to fulfill the contra order in a time out period, and in which at least a portion of the sufficient liquidity is reserved by other entities when a request is made. The distributed trading platform of A, in which the market data includes information about volatility of the financial instrument. The distributed trading platform of A, in which the financial instrument includes at least one of a stock and a bond. The distributed trading platform of A, in which the first order includes at least one of an order to sell the financial instrument and an order to buy the financial instrument at the market price, and in which contra order is for an opposite side of the first order. The distributed trading platform of A, in which the market price includes a midpoint of a national best bid and offer. The distributed trading platform of A, in which the contra order and the single second order are matched based on a time priority because the contra order is received by the central system before at least one second contra order form at least one second liquidity taker of the plurality of liquidity takers.

The distributed trading platform of A, in which receiving the indication that the third quantity of the financial instrument is reserved in the second order management system by the central system include receiving the contra order as a firm order from the liquidity taker for matching by the distributed trading platform. The distributed trading platform of A, in which the second participant system and the second order management system securely store trading intentions of the liquidity trader as a dark pool of liquidity. The distributed trading platform of A, in which the second participant system communicates with the second order management system through an API of the second order management system. The distributed trading platform of A, in which determining that the contra order is stored in the second order management system includes monitoring a polarity of trading intentions stored in the second order management system that are marked for matching through the distributed trading platform. The distributed trading platform of A, in which the second participant system is configured to maintain secrecy of the second orders of the plurality of second orders other than the single second order. The distributed trading platform of A, in which populating the second trader interface includes transmitting price and quantity information for use in a graphical user interface. The distributed trading platform of A, in which transmission of the contra order to the central system is performed in response to receiving, by the send participant system, an indication of a successful reservation of the contra order with the second order management system. The distributed trading platform of A, in which receiving the indication that the third quantity of the financial instrument is reserved in the first order management system includes receiving the single second order as a firm order form the liquidity provider for matching by the distributed trading platform. The distributed trading platform of A, in which the distributed trading platform includes the plurality of participant systems of the plurality of liquidity takers. The distributed trading platform of A, in which facilitating execution includes communicating, through the second commutation link, with a remote electronic clearinghouse to execute the exchange. The distributed trading platform of A, in which the central system is configured to determining a part of at least one of the contra order and the single order to fulfill through one of a plurality of protected trading venues with orders pending at a better price for one of the liquidity taker and the liquidity provider.

B. The distributed trading platform of A, in which the central system is configured to: in response to an execution of the exchange, transmit, through the second communication link, an indication of the execution to each of the first participant system and the second participant system; in which the first participant system is configured to: receive, through the first network link, the indication of the execution; and in response to receiving the execution, update, though the first network link, contents of the first order management system to reflect the execution; and in which the second participant system is configure to: receive, through the third network link, the indication of the execution; and in response to receiving the execution, update, though the third network link, contents of the second order management system to reflect the execution. The distributed trading platform of B, in which the first participant system is configured to: in response to updating the contents of the first order management system to reflect the execution, determine, by communicating through the first network link with the first order management system of the liquidity provider, a new first order that is stored in the first order management system and that is identified for processing by the distributed trading platform, in which the new first order reflects the first order with the update, in which the new first order is for a first side of the trade for a fourth quantity of the financial instrument.

FIGURES

DETAILED DESCRIPTION

Various embodiments are directed to a distributed trading network and interface. In some embodiments, the distributed system interacts with one or more order management systems to determine available orders for one or more liquidity providers. In some embodiments, the distributed trading system determines quantities and prices for a plurality of orders based on the available orders that it seeks to match. In some embodiments, the distributed system interacts with order management systems to determine which of the plurality of orders to solicit matches from liquidity takers. Various embodiments improve the speed, efficiency and usability of traditional trading systems and traditional trading interfaces.

In one exemplary embodiment, a memory stores instructions which, when executed, directs at least one processor to perform various actions. The processor may receive information about a first order in an order management system of a market participant (e.g., a liquidity provider) and determine prices and quantities for a plurality of second orders based on the first order. The prices and quantities for the second orders may be based on a variety of parameters (e.g., expected market impact, aggression) attributed to execution of each of the plurality of orders. The processor may search for matches to the second orders in an attempt to work or fulfil the first order for the market participant by causing specific ones of the second orders to be displayed to respective second market participants (e.g., liquidity takers) based on the contents of the second market participants order management systems. In response to matching one of the plurality of second orders, the processor may attempt to reserve orders in an OMS, execute a trade and/or adjust one or more of the remaining second orders.

Market participants may be infected with a fear of signaling that prevents them from displaying their trading intentions. A liquidity provider that has less signaling fear may submit orders to a distributed trading system such as the ne described here to work an order while reducing and/or capturing market impact costs.

Figure 1:
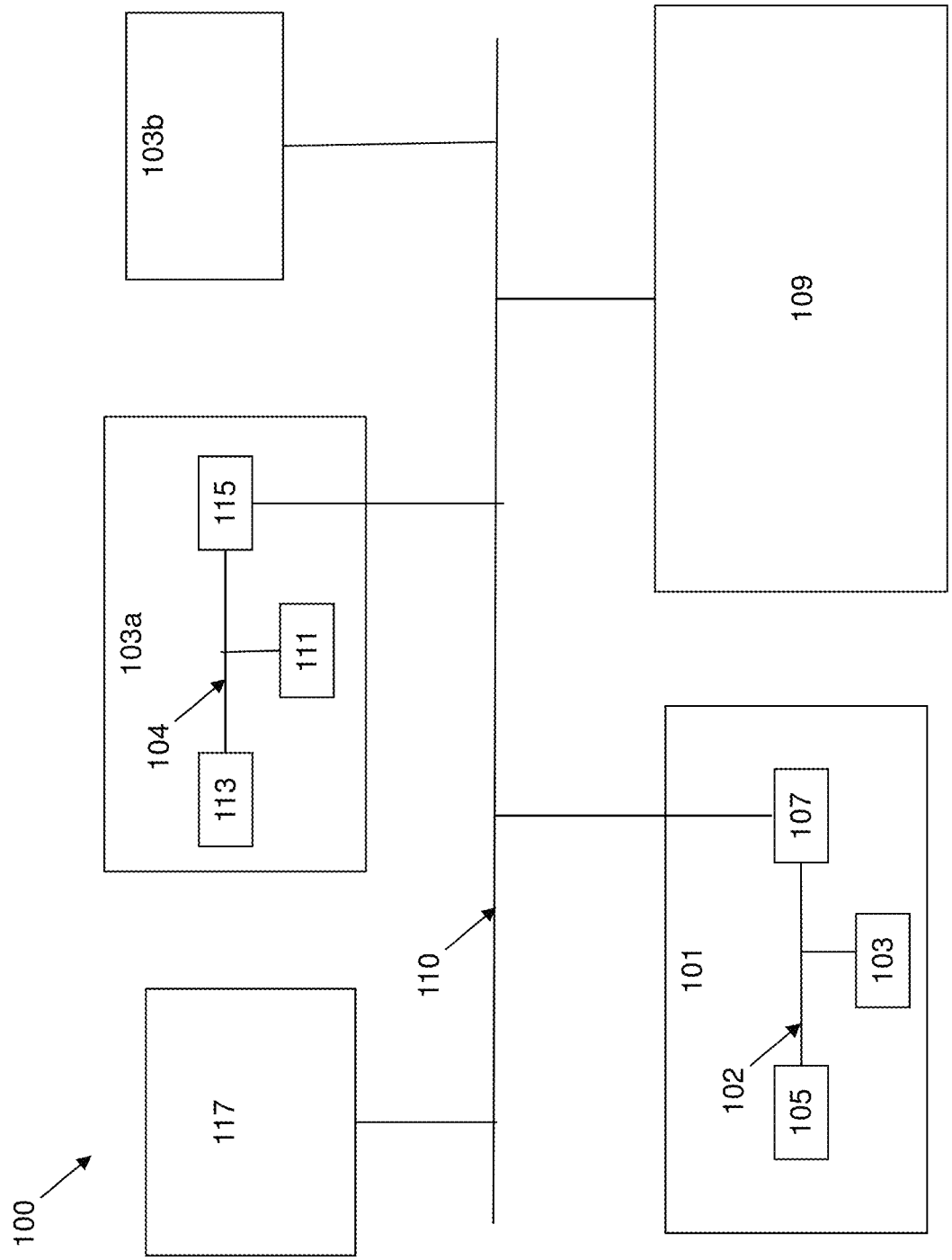
FIG. 1 depicts a system according to at least one embodiment of the systems disclosed herein.

Some embodiments may include systems and methods for interacting with order management systems and/or execution management systems of liquidity takers and liquidity providers to facilitate targeted multi order matching. FIG. 1 depicts a system according to at least one such embodiment. It should be recognized that the elements and arrangement of this depicted system are given as an illustration only. Other embodiments may include more, fewer, different, differently arranged, and so on elements.

The distributed system 100 of FIG. 1 includes a liquidity provider 101. In some embodiments, a liquidity provider may include a buy side entity that provides aggressor orders to a marketplace. A liquidity provider may have a set of trading desires (e.g., a desire to buy and/or sell a variety of financial instruments in pursuit of a trading strategy).

Such trading intentions may generally be held securely in an order management system of the liquidity provider. FIG. 1 illustrates a liquidity provider including an order management system 103. In some embodiments, such a system may be or may include an execution management system. Order management systems and Execution management systems are known in the art and may be used interchangeably for the purposes of this disclosure. Some example of OMSes/EMSes may include the Fidessa order management system, the Charles River OMS and the Bloomberg execution management system. An OMS may track order status, allow reservation of orders, allow reading of orders, allow orders to be canceled, allow orders to be marked as fulfilled, allow entry of new orders, and so on.

Such an order management system may include an API that presents read, write, and/or modify capabilities to the OMS for authorized systems. A trader using a trader interface may be authorized to enter, receive and/or modify information in the OMS. A participant system (e.g., 107) may be authorized to enter, receive and/or modify information in the OMS. The OMS may receive instructions through the API and respond to the instructions to enable such reading, writing, and/or modifying.

In some embodiments, such an OMS may receive order intentions for a liquidity provider (e.g., through a trader interface 105), communicate orders to a participant system (e.g. 107), receive a request to reserve liquidity for an order, attempt to firm up liquidity by canceling sufficient reserved liquidity elsewhere (e.g., in other trading venues or with other brokers that are working an order in an OMS), report to a participant system results of firming up liquidity, receive a modification of liquidity for an order, and/or modify orders to reflect fulfilled liquidity.

A liquidity provider may include one or more trader interfaces. An example of such a trader interface is indicated at 105. Such an interface may include a workstation of a trader that may enter and/or engage with trading intention stored in the OMS 103 and/or orders being worked through the distributed system or elsewhere using a graphical user interface. In some embodiments, a trader interface may be used to enter an aggression level, to enable matching of orders through the distributed system, to interact to prompts from the distributed system and/or to manage trading through the order management system. A liquidity provider may include numerous trader interfaces in some implementations.

A liquidity provider may include a participant system that interfaces the liquidity provider with a central system 109 of the distributed system. An example of the participant system is indicated at 107. For example, the participant system may interact with an OMS to read information about orders that is then transmitted to the central system. As another example, the participant system may interact with an OMS to reserve orders, identify that orders are filled, or otherwise write or modify information in the OMS. To facilitate such interaction, the OMS may communicate with an API of the OMS and/or snoop and analyze packet transmission to and/or from the OMS. A participant system may read orders from an OMS, transmit those orders to a central system for attempted order matching, receive information that a match fulfilling at least a part of the order has been found through the central system, attempt to reserve liquidity in the OMS in response to receiving the match, notify the OMS whether the liquidity has been reserved successfully, receive an indication of order execution through the central system, and modify the OMS to indicate that the at least the portion of the part of the order has been fulfilled.

In some embodiments, a participant system may interact with a trader interface 105 to control the trader interface to present information or solicit input. For example, such a participant system may prompt a trader interface to request an aggression level input. Such a participant system may receive an aggression level from a trader interface and/or report the aggression level to the central system. In some embodiments, a participant system may control a trader interface to display an indication of order fulfillment in response to an execution of a second order based on an order in an OMS.

In some embodiments, a participant system may interact with a central system 109. For example, a participant system may send the central system information about responses to prompts or input through the trader interface, information about orders and/or reservations in an OMS, and may receive information about order fulfillment and/or requests for reservation form the OMS.

The identified components of a liquidity provider may include computing devices such as processors, workstations, blades, servers, displays and so on. The identified components may include software and/or hardware modules that may perform functions discussed herein. Components of liquidity provider 101 may interact with each other through a network of liquidity provider 101. Such a network is indicated at 102. In some embodiments, such a network may include a LAN or other local real or virtual network with wired and/or wireless components. Communication between elements may take place using a FIX or other protocol. Communication may include encrypted communication that keeps trading intention secure.

Some embodiments may include a central system 109. Such a system may include an order matching system that receives orders from a party (e.g., a liquidity provider) and attempts to facilitate execution of trades that fulfill the orders (e.g., against matching contra orders of liquidity takers). Execution may be performed through an electronic clearinghouse that may be remote from the central system in some embodiments. Central system may receive an indication of an aggression level from a liquidity provider (e.g., entered through a trader interface and receive form a participant system). Central system may receive first orders from a liquidity provider (e.g., from a participant system that reads orders from an OMS of the liquidity provider), and determine a plurality of second orders for each of the first orders based on a received aggression level and/or other characteristics of an order and/or financial instrument. The second orders may each include a respective quantity and price. The central system may then distribute the second orders to a plurality of liquidity takers by communicating with liquidity takers (e.g., participant systems) in an attempt to fill the first orders of the liquidity provider. In response to determining a match for a second order (e.g., receiving an indication from a participant system of a liquidity taker that a firm order has been placed by the liquidity taker matching one of the second orders), if the second orders are still available, the central system may reserve or firm up trading intentions sufficient to fulfill a contra order with the liquidity provider (e.g., by communicating with a participant system of the liquidity provider), fulfill the orders if sufficient liquidity is successfully reserved (e.g., using a clearinghouse to execute a trader, in response to receiving an indication of successful reservation by the participant system of the liquidity provider), and notify the liquidity provider and liquidity taker (e.g., by communication to respective participant system) of execution. If liquidity for a first order remains after such fulfillment, the central system may continue working new second orders based on the remaining liquidity and/or adjust existing second orders to find additional matches.

In some embodiments, the central system may track second orders determined from a first order of a liquidity provider together. So, fulfillment of one order may affect other orders. For example, if one second order is filled, that filling may cause the other second orders to be canceled. To facilitate such tracking, a central system may maintain order identifiers in a database to identify which second orders may be related to one another. When an second order is filled, the central system may access the database to determine which other second orders to modify and/or cancel in response.

The central system 109 may comprise a computer, server, hub, central processor, memory and/or other entity in a distributed trading network. The central system 109 may comprise input and output devices for communicating with other various system 100 elements (e.g., network interfaces). In some embodiments, the central system 109 may comprise a trading platform, an exchange, or other order processing system. The central system may communicate with other system using a network 110. The network may include a public or private network. The network may include wired or wireless elements. The network may include the Internet. Communication may include encrypted communication that keeps trading intentions secure. The communication may use the FIX protocol in some implementations.

The distributed system of FIG. 1 includes a liquidity taker. The system shown includes two liquidity takers 103a and 103b. Liquidity taker 103a is shown in detail. Liquidity taker 103b may include a similar or different structure. There may be any number of such liquidity takers in various embodiments. In some embodiments, a liquidity taker may include an entity that responds to aggressive orders from a liquidity provider.

It should be recognized that while the system is described with reference to a liquidity taker and a liquidity provider that such a designation of taker or provider need not be a permanent label. A taker may sometimes act as a provider and a provider may sometimes act as a taker in the right scenarios where roles are reversed. Systems of one (e.g., participant systems, OMSes, trader interfaces) may have the functionality of the other and may swap functions depending on the role being played in a particular order. In other embodiments, a liquidity taker may operate exclusively as taker and a liquidity provider may operate exclusively as a provider.

A liquidity taker, like a liquidity provider may have a set of trading desires (e.g., a desire to buy and/or sell a variety of financial instruments to follow a trading strategy). Such trading intentions may generally be held securely an order management system of the liquidity provider. FIG. 1 illustrates a liquidity provider 103a including an order management system 111.

Such an order management system may include an API that presents read, write, and/or modify capabilities to the OMS for authorized systems. A trader using a trader interface may be authorized to enter, receive and/or modify information in the OMS. A participant system (e.g., 115) may be authorized to enter, receive and/or modify information in the OMS. The OMS may receive instructions through the API and respond to the instructions to enable such reading, writing, and/or modifying.

In some embodiments, such an OMS may receive order intentions for a liquidity taker (e.g., through a trader interface 113), communicate orders to a participant system (e.g., 115), receive an indication to reserve liquidity (e.g., from a trader interface and/or participant system for a trade that a trader has accepted), report to a participant system results of firming up liquidity, receive a modification of liquidity for an order, and/or modify orders to reflect fulfilled liquidity.

A liquidity taker may include one or more trader interfaces. An example of such a trader interface is indicated at 113. Such an interface may include a workstation of a trader that may enter and/or engage with trading intention stored in the OMS 111 orders being worked through the distributed system or elsewhere using a graphical user interface. In some embodiments, a trader interface may be used to receive and respond to trade prompts from a participant system, and/or to manage trading through the order management system. A liquidity taker may include numerous trader interfaces in some implementations.

A liquidity taker may include a participant system that interfaces the liquidity taker with the central system 109. An example of the participant system is indicated at 115. A participant system may perform interfacing between the liquidity taker and a central market system 107. For example, the participant system may interact with an OMS to read information about orders that may be used by the participant system to filter orders. As another example, the participant system may interact with an OMS to reserve orders, identify that orders are filled, or otherwise write or modify information in the OMS. To facilitate such interaction, the OMS may communicate with an API of the OMS and/or snoop and analyze packet transmission to and/or from the OMS.

A participant system may interact with a central system and a trader interface and an OMS. For example, in some embodiments, such a participant system may, read orders from an OMS, receive a plurality of second orders (e.g., an order ladder used to work a first order in an OMS of a liquidity provider) from a central system, filter the plurality of second orders to a single second order based the order read from the liquidity taker OMS, present the single order to through the trader interface of the liquidity taker, receive a firm order form the liquidity taker matching the single order, reserve the liquidity for the firm order in the OMS of the liquidity taker in response to receiving the firm order, transmit the firm order to the central system in response to reserving the liquidity and/or receiving the firm order, receive an indication that the firm order has been fulfilled from the central system, and modify the OMS of the liquidity taker to indicate that the firm order has been fulfilled in response to receiving the indication that the firm order has been fulfilled.

The identified components of a liquidity taker may include computing devices such as processors, workstations, blades, servers, displays and so on. The identified components may include software and/or hardware modules that may perform functions discussed herein. Components of liquidity taker 103a may interact with each other through a network of liquidity taker 103a. Such a network is indicated at 104. In some embodiments, such a network may include a LAN or other local real or virtual network with wired and/or wireless components. Communication between elements may take place using a FIX or other protocol. Communication may include encrypted communication that keeps trading intention secure.

In some embodiments, components of a central system, liquidity provider and or liquidity taker may operate behind a firewall such that users may not view or obtain the information behind the firewall. For example, information about second orders based on a first order in an OMS of a liquidity provider may be communicated to a participant system of a liquidity taker, but the liquidity taker and other users outside the system may be unable to view and/or access at least some of that information (e.g., second orders for which the liquidity taker is not qualified to see).

Some embodiments may include a data provider 117 that may provide information regarding financial instruments. Such information may be provided in real time, as information is created or as it first becomes available to the general public, or at another time. Data provider 117 may provide such information in any one or more of a variety of forms and means such as video, audio (e.g., radio broadcast), text (e.g., stock ticker-type information), or other data that may convey information. Data may be provided at a variety of different timings. In some embodiments, data may be provided in periodically, continuously, e.g., via a data feed (e.g., a stream of data that includes real time updates of trading-related information). In some embodiments, data may be provided after an event, e.g., a trade or submission of an order. In some embodiments, data provider 117 may provide to central system 109 trading-related information. In some embodiments, a central system may receive such information and use it in a determination of a plurality of second orders. In some embodiments, A central system may distribute such information to of elements of the distributed system.

It should be recognized that the various elements of system 100 are given as non-limiting examples only. Each component, element of a component and/or functionality of such an elements and/or components shown or described may be different, the same, or absent in various embedment. For example, in some embodiment, there may be multiple liquidity providers, a single liquidity taker, and/or a remote electronic clearinghouse that communicates with a central system through a communication network to execute orders matching one of the plurality of second orders. As another example, in some embodiments, a system may communicate with remote trading venues to enable compliance with Reg NMS.

Distributed system 100 may operate to enable a fast, efficient, secure and usable trading environment that improves on liquidity distribution, interface clutter and computer resource usage over traditional trading systems. Trading intentions that would otherwise have stayed private may become available and securely distributed to targeted parties. This may spread trading information more broadly, limit information leakage by preventing spread of information out of natural contra parties, limit bandwidth usage by limiting transmissions within a participant to highly relevant orders, limit interface cluttering by limiting order presentation to only highly relevant orders, and create a more optimal distribution of capital resources in a short amount of time.

Figure 2:
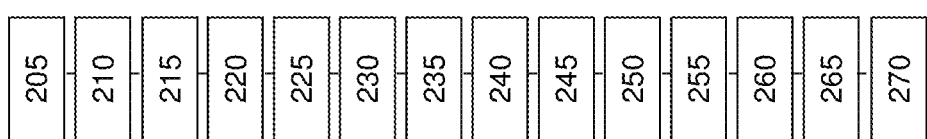
FIG. 2 depicts a flow diagram according to at least one embodiment of the methods disclosed herein.

Some embodiments may include a method. Such a method may be performed by a distributed system that includes components such as one or more of the components of distributed system 100. FIG. 2 depicts a flow diagram according to at least one embodiment of the functionality of such a distributed system.

It should be understood that each function(s) described for each block may be performed using one or more computer components capable of performing that function. It should also be appreciated that the acts described in these blocks may be performed in any order (including but not limited to the exemplary orderings shown on the diagram), not all blocks need be performed and that some blocks may be performed together, simultaneously and/or as a single act.

In block 205, the system 100 may receive an aggression indicator from a liquidity provider. Such an aggression indicator may be input into a trader interface (e.g., using a dial interface, using a numerical entry interface), received by a participant system and transmitted to a central system. Such an aggression indicator may be stored by the central system and used to determine prices for second orders. The aggression indicator may be a numerical value that indicates how much of a price premium the liquidity provider desires to capture for large blocks of liquidity. In one example, the aggression indication may range from 0 indicating no premium to 1 indicating 100 percent of an available premium (e.g., an estimated market impact). Any of a variety of other indicators or aggression values may be used (e.g., tracking error, opportunity cost, greater than 1, less than 0, etc.). An aggression indicator may have any desired level of specificity. For example, in some embodiments a single aggression indicator applies to all orders from a liquidity provider. In other embodiments, different order types may have different aggression indicators (e.g., by instrument type, by specific instrument, by industry, by liquidity levels, and so on). In other embodiments, each order may have a separate aggression level. In still other embodiments, no aggression level may be received and a central system may determine pricing without such input. In still other embodiments, a variety of factors that may be used to determine prices may be received rather than and/or in addition to a single aggression level.

When a large order is presented or reported in a market, there may be a market impact associated with the order. To account for that market impact, when a market participant desires to move a large amount of shares, they generally expect to pay a premium for that ability. But since there are two parties to a trade, and both are moving the large amount of shares, there may be a disagreement as to who should pay the premium. In some prior trading systems, the aggressor has paid the premium. The aggressor has revealed their intentions and is soliciting passive participation. The aggressor generally has to pay the premium to the passive participants to encourage them to engage in a trade. Participants may hide their trading intentions avoiding becoming an aggressor for fear of signaling that would move the market to price in the premium.

In some embodiments, the aggression level may indicate an amount of such a premium that the liquidity provider expects the liquidity taker to pay. In some prior systems, a liquidity provider or aggressor would pay all of that premium. In some embodiments, in a distributed trading system with multiple conditional order matching with access to dark pools and directed order filtering, the liquidity provider can request a premium price from the liquidity taker.

In some embodiments, by allowing the liquidity provider to set an aggression level, the liquidity provider may have agency over the second orders that are generated by a central system. A single input may make this control by the liquidity taker easy and seamless.

In block 210, the system 100 (e.g., participant system 107) may identify a first order, (e.g., in an order management system 103) of a liquidity provider 101 that is designated for distributed order matching through the system 100. This identification may be performed by reading information from an order management system through an API, packet capturing of transmissions made to and/or from an OMS 103, from a communication from trader interface 105 selecting the order for submission to the distributed system, and/or through another method or responsive to another input. In some embodiments, a trading interface may be used to designate specific orders in the OMS for order matching through the distributed system. The first order may include an order to buy or sell a quantity of a financial instrument (e.g. stock, bond, derivative, etc.). For example, the first order may be an order to sell 20,000 shares of Google stock at market price. For the purposes of this example, the current market price may be assumed to be $141.

In block 215, the system 100 may cause the first order to be transmitted to and received by central system 109. This may be performed in response to identifying the first order. In this way, the central system becomes aware of information that is hidden securely from the public in what may be an otherwise dark pool of liquidity that is stored securely in the liquidity providers order management system. The central system may then be able to use this information to search for order matches hidden in other dark pools of liquidity in liquidity taker OMSes.

In block 220, the system 100 (e.g., the central system) may determine a plurality of orders (e.g., conditional orders) based on the first order, e.g., at a plurality of different prices and quantities. The price and quantity elements may be based on an aggression indicator of the liquidity provider. For example, based on an order to purchase 20000 shares of Google stock at $141 each that is stored in a liquidity providers order management system, the central system may determine a plurality of orders at different quantities and prices that would fill (or at least partially fill) the order. Higher quantities may have prices that are more advantageous to the liquidity provider representing a liquidity premium provided to the liquidity provider or cost of moving a large block of liquidity for a liquidity taker. An aggression indictor may indicate how aggressive such a primum may be. The orders may include a series of unique quantities increasing up to 20000 shares (e.g., 1000, 2000, 5000, 10000 and 20000).

In some embodiments, the system (e.g., central system 100) may generate a formula defining a relationship between prices and quantities (or otherwise a formula that can output a price given a quantity, or vice versa) or a price/quantity matrix defining a price for each of a plurality of quantities. The prices may be determined based on one or more factors, such as an amount of impact cost for a particular quantity (e.g., as measured from a point of view of a contra party trader who would be on the other side of a trade for a second order, or alternatively as measured by a liquidity provider).

For some of the orders, filling the order would effectively fill a portion (e.g., a substantial portion or majority of) the original order. For example, the system may generate orders at prices and quantities of 20,000 shares at $141.00, 18,000 shares at $141.01, and 16,000 shares at $141.02.

In some embodiments, the prices of the orders for each quantity may reflect a market impact cost for moving an order of that size. This is a cost that might traditionally be a burden of a liquidity provider, but in some embodiments of the present invention, at least a portion of the cost may be transferred to the liquidity taker. The portion may be a multiple of an aggression level (e.g., 0 to 100%). In some embodiments, an aggression indicator may be multiplied by this price change to possibly reduce (or in some implementations possible increase the change). For example, an aggression indicator in some implementations may range from 0 indicating 0% to 1 indicting 100%. This multiplier may indicate what percentage of the price change should be added (or subtracted) to a price in an order management system of a liquidity provider (or a current market price in some embodiments).

In some embodiments, with respect to impact cost, the system (e.g., the central system) may determine an estimated amount by which the market price for the trading product is expected to move adversely to a party if a party were to trade a given quantity in a second order. For example, based on information such as historical market data, the central system may estimate that if a party attempted to purchase a block of 10,000 shares of IBM stock that is currently trading at $20 per share, the price of IBM stock would increase to $21 per share. The central system may also estimate that if a party attempted to sell a block of 20,000 shares of IBM stock that is currently trading at $20 per share, the price of IBM stock would decrease to $18 per share. Conversely, the central system may estimate that if a party attempted to sell a block of 10,000 shares of IBM stock that is currently trading at $20 per share, the price of IBM stock would decrease to $19 per share. And, the central system may estimate that if a party attempted to sell a block of 20,000 shares of IBM stock that is currently trading at $20 per share, the price of IBM stock would decrease to $18 per share. Notably, the market impact costs may be different for different quantities, and the calculated prices at different quantities may reflect this.

It should be appreciated that impact cost can be determined for the original trader (whose OMS has the original order) and/or for a hypothetical contra party who has a contra interest at that quantity. For example, while it may be estimated that a trader may suffer a $1 impact cost when purchasing 10,000 shares of Google, and thus would effectively buy the 10,000 shares at a price $1 higher than market, it may be determined that a corresponding seller of 10,000 shares of Google would suffer a $1.05 impact cost when selling 10,000 shares of Google. When impact cost is used to calculate order prices for various quantities, the central system, in some embodiments, may use the impact cost from the perspective of the counter party (e.g., a generic liquidity taker) in some embodiments. Alternatively, the central system may use the impact cost from the perspective of the liquidity provider. In some instances the impact costs may be the same from either perspective.

Market impact costs may be affected by Average daily volume and recent historical volatility. For example, more volatile days may have a higher market impact cost. A calculation of estimated market impact cost may include determining a Standard deviation of daily price changes for prior orders.

Estimated premiums in price (for a given quantity) can be used to price a buy or sell order at that quantity or range of quantities. For example, for an OMS order to purchase 5000 shares of Apple stock, central system may price second orders at the designated quantity (5000 shares) as well as multiple different quantities that are smaller than 5000 (e.g., 4500, 4000, 3500, 3000, etc.). In some embodiments, the number of orders may include 100 orders, 1000 orders, 10 orders, 5 orders, 3 orders, 2 orders, 20 orders, and so on. In some embodiments, the quantities may include one or more of 100%, 95%, 90%, 80%, 75%, 65%, 50%, 40%, 30%, 25% 10%, and so on. Some embodiment may include an order for every price change in quantities below 100%. The specific quantities and number of orders are given as examples only.

As a further example, central system may determine a formula relating price to quantity such as Price=Market Price—aggression*market impact cost. Or in an embodiment that might not use an aggression or impact calculation, Price=($0.01*Quantity/1000), which would effectively decrease the price from market by $0.01 for every thousand shares.

In some embodiments, the central system may ignore fractional price and quantity amounts, and may effectively use a step function. In some embodiments, the central system may effectively assign prices for quantity ranges (e.g., a purchase price of $28.50 for all quantities between 8000 and 9999, and a purchase price of $28.25 for all quantities between 6500 and 7999, etc.).

In one example, the central system may produce a matrix or ladder of discount bids or premium offers (so-called "reservation prices"). In addition or alternative to impact cost, other factors may be used to produce prices for such bids or offers based on an order. In some embodiments, the prices may be determined based on tracking error. For example, an inventory-cost component of the model may produce either a premium that would be needed as compensation for a trade that pushes a fund out of balance with respect to its benchmark, or a zero-cost offer to do a trade that moves the portfolio back toward the index. As another example, opportunity cost may be included in a calculation. If a trader waits to make a trade, a market may move against them whereas if they move now, there is less of a chance of adverse movement. As another example, adverse selection risk, i.e., risk that the fund incurs losses when it posts quotes that can be "picked off" by better-informed traders in the crowd—the fund will on average be on the wrong side of these trades—by definition, prices will on average rise after the fund has sold stocks to these better-informed traders, and fall after it has purchased stocks from them. As another example, manipulative trading risk, that is, risk that arises if traders can successfully manipulate prices (and avoid legal consequences). Manipulative traders in this category are defined to have no "inside" information about the company. Rather, the manipulative trader forces the midpoint of the bid and ask quotes to be transitorily away from the market's "equilibrium price" by his trading actions. In some implementations, impact risk cost may attempt to capture one or more of such potential trading costs. In some embodiments, the price for a given quantity may be determined based on one or more factors, such as current market price, time to trade out of the order, and other factors. A transaction and/or impact cost used to price a quantity for a trade may take one or more of such factors in to consideration to determine an expected premium amount.

In some embodiments, the central system may produce bid or ask prices (for various different quantities) relative to a currently existing "market price"—that is, spreads relative to the existing market price at which a user may at the margin be willing to buy/sell stocks. In some embodiments, the market price may be proxied by the mid-point of the most recent inside bid and ask quotes in the market (the NBBO), and the bid or ask price may be quoted as a spread to that midpoint.

In other embodiments, the central system may produce bid or ask proves relative to a price for a received order in a liquidity provider's OMS. In some embodiments, the central system may generate ladders of spreads for a range of order sizes, or reciprocally, ladders of order sizes for an array of spread increments. The tiers in the ladder may be quoted in terms of marginal spreads (to market price) at different tiers, e.g., $10.80 for size 10,000 ask, $10.83 for 20,000 ask, is output as a marginal 3 cents for a marginal 10,000 shares.

Below are some exemplary illustration of calculated bid (or ask) prices based on a given order to buy (or sell), e.g., stored in a user's OMS (expressed as a spread from the current market price or OMS order price).

TABLE 1

| Bid Size | Spread |
|---|---|
| 0 | 0.00 |
| 10,000 | −0.01 |
| 20,000 | −0.01 |
| 30,000 | −0.01 |
| 40,000 | −0.01 |
| 50,000 | −0.01 |
| 60,000 | −0.02 |
| 70,000 | −0.02 |

TABLE 2

| Bid Size Range | Spread |
|---|---|
| 0 | 0.00 |
| 50,000 | −0.01 |
| 100,000 | −0.02 |
| 150,000 | −0.03 |
| 200,000 | −0.04 |

TABLE 3

| Ask Size | Spread |
|---|---|
| 0 | 0.00 |
| 10,000 | 0.01 |
| 20,000 | 0.01 |
| 30,000 | 0.01 |
| 40,000 | 0.01 |
| 50,000 | 0.01 |
| 60,000 | 0.02 |
| 70,000 | 0.02 |

TABLE 4

| Ask Size Range | Spread |
|---|---|
| 0 | 0.00 |
| 50,000 | 0.01 |
| 100,000 | 0.02 |
| 150,000 | 0.03 |
| 200,000 | 0.04 |

Information such as market price may be obtained by the central system or participant system to determine an actual price from such spread information. Information used to determine impact cost such as historical data, liquidity, and so on that may be used to determine a price may also be received by a central system form a data provider.

In some embodiments, determining each order may include determining a minimum fill quantity and a maximum contra display quantity. A minimum fill quantity may be a minimum amount that can be matched against an order. A max contra display may indicate a maximum amount that a counter party (e.g., a liquidity taker) may have in an OMS to be qualified to view the order. Such parameters of an order may be used so that a contra party (e.g., a liquidity taker) is limited to seeing a maximum of a single order of the plurality of second orders. If there are two second orders, order A with quantity X and another, next largest sized order B with a lower quantity Y, for the order A with quantity X, the minimum fill amount may be set to Y+1. For the order B with quantity Y, the maximum contra display may be set to Y. For order A, if it is the highest sized of the second orders, then it may have no maximum or an infinity maximum contra display. If it is not, the its max contra display may be set to X. For order B, if it is the minimum order of the second orders then its minimum fill may be set to zero or some minimum amount that a liquidity provider or system is designed to process. If it is not, then its minimum fill size may be set to one more than the next largest order.

In some embodiments, minimum fill quantity and maximum contra display quantity may be included in order parameters. Such order parameters may be used by a participant system to filter orders so that a liquidity taker is only qualified to view a maximum of one of a plurality of second orders that correspond to each submitted first order from a liquidity provider.

In block 225, information about the plurality of second orders may be communicated to liquidity takers by system 100. The determined orders may be transmitted from the central system to respective participant systems at each of a plurality of liquidity takers. The participant system may receive the orders. Each order may identify a price and a quantity. Each order may identify a minimum fill quantity and a maximum contra display quantity. Effectively, the received second orders may be divided into a plurality of non-overlapping quantity ranges going up to a full quantity of a first order in an OMS of a liquidity provider.

In block 230, the system 100 (e.g., participant system 115) may determine orders in the OMS of a liquidity taker. This may be done for each liquidity taker that participants in the distributed system 100. These orders may be determined by reading information from an order management system through an API, packet capturing of transmissions made to and/or from an OMS 111, from a communication from trader interface 113 selecting the order for submission to the distributed system, and/or through another method or responsive to another input. In some embodiments, a trading interface may be used to designate specific orders in the OMS for order matching through the distributed system.

In block 235, the system 100 (e.g., participant system 115) may determine whether the liquidity taker is qualified to view an order of the plurality of orders and/or which order of the plurality of orders the liquidity taker is qualified to view. Each participant system of each liquidity taker may perform a similar determination. Different liquidity takers may be qualified to view different orders of the plurality of second orders despite each order being derived from a common first order of the liquidity provider.

In some embodiments, determining whether the liquidity taker is qualified to view an order may include determining whether the liquidity taker has a contra order to a second order of the plurality of second orders in its order management system by referencing the received information from block 230 and the minimum fill sizes of the second orders. If there is a contra order with sufficient size (e.g., size at least as great as a minimum fill size of at least one of the plurality of second orders) to match against a second order then the liquidity taker may be determined to be qualified to view a second order of the plurality of second orders.

In some embodiments, a qualifying liquidity taker may only be qualified to see a specific second order of the plurality of second orders that most closely matches their contra order's quantity (i.e., a second order whose minimum fill is less than or equal to the contra order and whose maximum contra display is greater than or equal to the contra order quantity). The specific second order of the plurality of second orders may be determined by comparing the quantity of the contra order to the minimum fill quantities and maximum contra display quantities of each second order to determine which specific second order has a range into which the contra order of the liquidity taker falls. That determined second order may be a single second order that the liquidity taker is qualified to view. A participant system may filter all other orders out preventing the liquidity taker form viewing them.

In some embodiments, other criteria (e.g., from broker system or user) may govern who can see or trade against one user's interest, such as credit limits; minimum volume traded in the trading product or type; and/or exclude "undesirable" traders, e.g., traders who have been identified to be undesirable counterparties. In some embodiments, a particular user may be qualified to view information about an order based on one or more factors such as (a) the user's portfolio, (b) the user's trade history, (c) the user's order history, (d) the user's outstanding orders, and (e) trading interest specified by the user, and other factors. In some embodiments, a user may be qualified if the user is sufficiently active in trading that product or type, e.g., if the user has already traded an amount (e.g., above a threshold amount) of that product or type (e.g., within a past predetermined minimum period of time).

Figure 3:
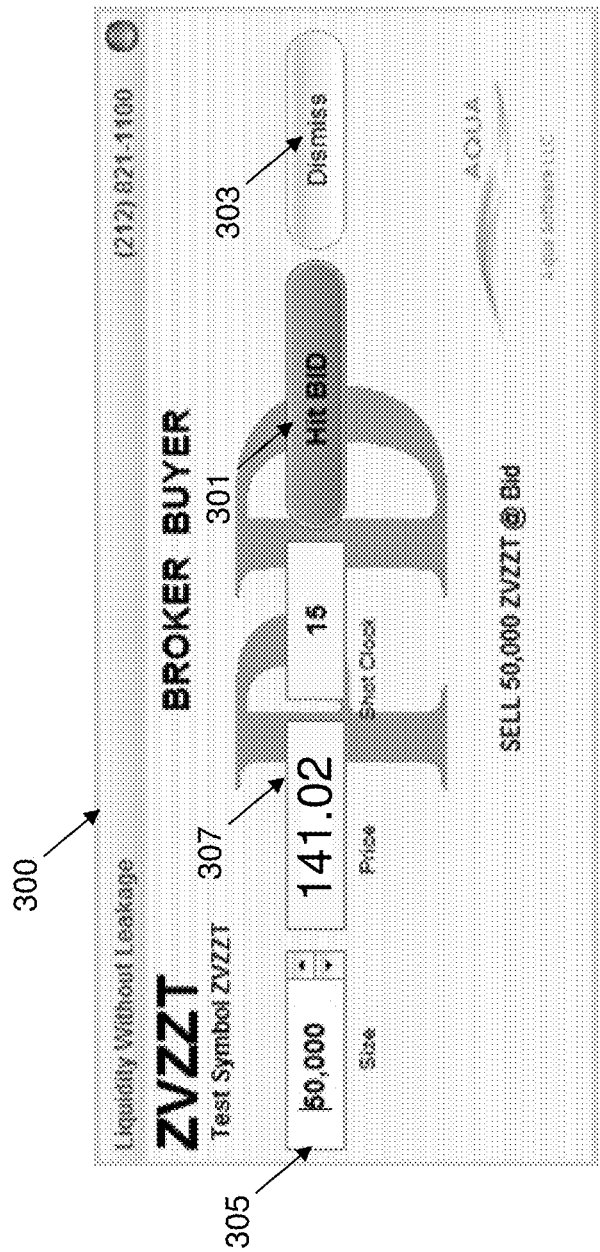
FIG. 3 depicts a popup element that may be part of a graphical user interface in some embodiments.

In block 240, the system 100 (e.g., participant system 115 and/or trader interface 113) may present information about the qualified second order of the plurality of second orders to the liquidity provider (e.g., to a trader using the trader interface). This information may be displayed through a graphical user interface at the trader interface. A popup or prompt may ask for the liquidity taker to enter into a firm order fulfilling at least part of the qualified second order. FIG. 3 illustrates an example popup interface that may be used in some embodiments. The liquidity taker may thus remain ignorant of the other second orders and only be presented with the most relevant information about an order that is pending and a quantity that is pending in the liquidity takers OMS. This provides an efficient, secure and usable interface experience for the liquid taker that enables a highly informed and quick interaction with the distributed trading system.

In some embodiments, presentation of information may be performed at each of the liquidity takers that qualify to view a second order of the plurality of second orders. The liquidity takers may view different second orders based on their determined qualifications. For example, if the qualifying trader has an existing contra interest in trading 16,000 shares against a first order in an OMS of a liquidity provider to trade 20000 Google shares, then the qualifying trader may see a single conditional order having a quantity of 16,000 shares at a price of $141.02, which may be determined to be the "closest" of the plurality of orders to the trader's existing interest. Another liquidity taker with an interest in trading 18,000 shares may instead see a single condition order having a quantity of 18,000 shares at a price of 141.01.

In some embodiments, a pop-up window (e.g., graphical user interface 300) may prompt the qualifying trader to trade or dismiss the order through trading interfaces 113. For example, a pop-up window may display an option to engage the offer such as button 301. This may be an option to hit the bid (as in the example) or lift an offer depending on the side of the trade that the first order in the OMS of the liquidity provider. The pop-up window may display an option to dismiss the offer such as button 303. The popup window may include an option to adjust a size such as size interface 305. The popup window may include an indication of a price 307. The price may not be affected by the liquidity taker adjusting a size. For example, if the 18000 share liquidity taker in the example above decreases the size to 16000, the price shown to the liquidity taker may stay at 141.01 and not change to 141.02. This feature may keep the liquidity taker in an appropriately priced order for the contents to the liquidity takers OMS and prevent a gaming of the system and/or submitting multiple smaller orders by the liquidity taker to reduce a liquidity premium to the liquidity provider.

In some embodiments where price is a market price (e.g., a midpoint of an best bid or offer), the price may be continually updates as the market price fluctuates. In other embodiments, the price may stay stable for some period of time (e.g., a shot clock time that is available for the liquidity taker to react to the offer (e.g., 15 seconds). In still other embodiments, the price may be expressed as an offset from the market price that may be stable and/or may adjust to market conditions depending on the embodiment.

In block 245, the system (e e.g., participant system 115, trader interface 113 and/or central system 109) may receive a request to execute a trade fulfilling the qualified second order from the liquidity taker. For example, the liquidity taker may operate a graphical user interface of the trader interface to indicate acceptance of an offer. Information may be transmitted to the participant system from the trader interface identifying the request.

In block 250, the system (e.g., participant system 115, trader interface 113 and/or central system 109), responsive to receiving the request to execute the trader, may reserve the contra order in the liquidity taker's OMS. This reservation may be performed by communicating a request to reserve from the participant system or from the trader interface to the liquidity takers OMS. This action of reserving the contra order makes the contra order a firm order and prevents other trading venues or brokers from acting on the contra order while it is reserved.

Receiving a request to execute a trade and reserving liquidity with a liquidity taker's OMS may take place in a variety of manners. For example, in some implementations, a request to execute a trade may be transmitted to and received by a central system (e.g., from a trader interface to a participant system and then to a central system). The central system may determine that the second order is still available (e.g., that one of the plurality of second orders hasn't been taken by another higher time priority liquidity taker leaving insufficient liquidity to fulfill the contra order). In response to such a determination, the central system may request that liquidity be reserved, through the participant system and the OMS of the liquidity taker. If the central system determines that the second order is not available, the central system may notify the participant system and no reservation of liquidity may occur.

As another example, a reservation of liquidity may be performed before a central system is notified of the order. A participant system may receive the request from the trader interface and in response reserve the liquidity with the OMS. In response to reserving the liquidity, the participant system may notify the central system of the order. The central system may then determine whether the second order is still available (e.g., that one of the plurality of second orders hasn't been taken by another higher time priority liquidity taker leaving insufficient liquidity to fulfill the contra order). If the second order is still available, the method may continue. If the second order is not available (has been matched elsewhere and/or been canceled) then the central server may release the reserved liquidity with the liquidity taker (e.g., through commutation with the participant system 115).

In such manners a time priority based system may allow multiple liquidity takers to respond to the different second orders with an earliest timed one given a highest priority. Other embodiments may include other priority mechanisms, such as a highest size quantity during some search time period. Various embodiments may set the relevant time for the time priority as a time received by a participant system, a time reserved with an OMS, a time received by the central system, and so on.

In block 255, responsive to reserving the contra order in the liquidity taker's OMS, the system 100 may attempt to reserve liquidity sufficient to fulfill the contra order in the liquidity provider's OMS. For example, a participant system 115 may receive an indication that the liquidity taker accepted an offer to engage with a qualified second order and that the contra order is reserved in the liquidity taker's OMS. In response, the participant system may transmit such information to the central system. The central system may receive the information from the participant system of the liquidity taker. If the second order is still valid (e.g., if other orders haven't been received first to adjust the second order), the central system may in response to receiving the information, transmit the information to the participant system of the liquidity provider to request reservation of shares to fulfill the contra order. The participant system 107 may receive that information, and in response, the participant system may communicate with the liquidity provider order management system 103 asking that the number of shares (e.g., 16000 shares of google) be reserved for execution through central system.

It should be appreciated that the liquidity provider may be shopping all or a portion of first order elsewhere, and that the order may be cancelled or filled elsewhere during the process described herein. If the order has already been executed elsewhere or cancelled, then the liquidity may not be available in the liquidity providers OMS to fulfill the contra order. In such a case the trade may be cancelled and the contra order's reservation in the liquidity takers OMS may be released. In some implementations, there may be a minimum fill percentage that is less than 100% that may still allow the contra order to continue despite insufficient liquidity (e.g., 90%).

In some embodiments, a portion of a first order may be reserved by another entity when a request for reservation is received by the liquidity provider (e.g., liquidity providers OMS). In such an instance, the liquidity provider may attempt to firm up the liquidity sufficient to fulfill the contra order. Such a firming up may include canceling reservations with other trading venues and/or brokers that have not yet completed trades. If the liquidity provider is able to firm up sufficient liquidity, then the liquidity provider OMS may reserve the shares for the contra order. In response to receiving a request to reserve, the OMS may transmit cancelation messages to remote trading partners that have reserved liquidity with the OMS to firm up sufficient liquidity.

If the liquidity provider's OMS reflects sufficient liquidity or the liquidity provider is able to firm up sufficient liquidity, the OMS may reserve the shares and notify the participant system 107 that the share have been reserved. In some embodiments, shares may be reserved in an OMS (whether taker or provider) for some limited period of time. After that time period passes, the shares may be released by the OMS. In other embodiments, the shares may be reserved until actively released by the entity reserving the shares.

In block 260, responsive to reserving the liquidity in the liquidity provider's OMS, the system may facilitate execution of a trade fulfilling at least part of each of the qualified second order and the contra order. In response to receiving information indicating that liquidity has been reserved by the OMS 103, the participant system 107 may communicate with central system 109 that the liquidity is reserved. In response to receiving such information, the central system may take actions to execute the trade. For example, the central system may communicate with a remote electronic clearinghouse to execute the trade.

In some embodiments, if a price of a trade is outside of a NBBO spread, then the central system may communicate with remote trading venues so that orders at protected venues of Reg NMS for better prices are included in a trade. In this instance, the trade that is executed with the clearinghouse may not be for the total quantity agreed upon. For example, a central system may receive market data indicating that there are orders at better prices than a matched price at one or more remote protected trading venues. The system may communicate with those venues so that the orders there are matched against prior to matching between the second order and the contra order. This may leave some amount of size left in the second order and contra order ([second order size or contra order] minus orders at the protected venues for better prices). This remaining order size may be executed to fill the rest of the second order and contra order. In this way, one of the second order and contra order may be filled completely and the other may be partially filled (missing the protect order liquidity). In some instances, where the second order is for only a portion the liquidity in an OMS of a liquidity provider and part of the second order is filled with orders at a protected venue, the remaining liquidity at the liquidity provider may be used to fill the remaining part of the contra order. In some embodiments, no trade may occur if there is not at least some minimum fill amount for each order (e.g., 90%).

In block 265, in response to executing the trade, the system may modify contents of the liquidity provider's OMS and the liquidity taker's OMS. For example, the central system may determine that a trade has been executed (e.g., based on information received from a remote electronic clearinghouse) with particular parameters (e.g., price, quantity, time). In response to receiving that information, the central system may communicate the information to each of participant system 107 and participant system 115. The liquidity provider's participant system may receive the information and modify the contents of the liquidity provider's OMS in response to reflect to information (e.g., using an API to identify the trade has been executed in the OMS). The liquidity taker's participant system may receive the information and modify the contents of the liquidity taker's OMS in response to reflect to information (e.g., using an API to identify the trade has been executed in the OMS).

In block 270, a subsequent first order may be worked through the system for remaining liquidity in the liquidity providers OMS. For example, executing the trade may have fulfilled a part of the ordinally pending first order in the liquidity provider's OMS. There may still be a pending order for the same financial instrument in the liquidity provider's OMS (e.g., with a lower total quantity). The remaining liquidity may be worked by the distributed system. This working may be similar to that of the process described herein. This working may include modifying or determining new second orders based on a new first order.

For example, while the original trader wished to sell 20,000 shares of Google, and 16,000 shares of that order have been filled, the original trader's OMS may now reflect an order to sell 4000 shares of Google at market price. In some embodiments, pending second orders and pop-ups may be modified to reflect this change. In some embodiments, new second orders may be determined and new popups may be presented to reflect this change. In some embodiments, the second orders and pop-ups may be cancelled, deleted, or otherwise removed from the system and then re-generated based on the updated quantity. It should be appreciated that in some embodiments, if the original order is completely filled, then no additional working of the order may take place.

Some embodiments may maintain anonymity of participants from one another. A party's identity may be kept hidden form a contra party. In this manner information leakage, may be further reduced.

The above description is included to illustrate the operation of a non-limiting example and is not meant to limit the scope of the invention. From the above discussion, many variations will be apparent to one skilled in the relevant art that would yet be encompassed by the spirit and scope of the invention.

For example, although examples are given in terms of a central system, it should be recognized that other embodiments may not include such a central system. For example, one or more participant systems may perform one or more functions of the central system in some implementations. Other implementations may not include participant systems or a central system but rather OMSes may perform the role of both elements. In yet another example, roles described as part of a participant system may be performed by a central system, an OMS or the other party's participant system. For example, order filter may be performed by a central system in some implementations where a central system maintains order information from OMSes of participants rather than participant systems.

As still another example, although embodiments are described as having different prices at different quantities for second orders, it should be recognized that some embodiments may include a single impact cost that does not differ based on quantity. As yet another example, although some embodiments are described as displaying only a single order to a liquidity taker other embodiments may display multiple orders (e.g., order may have overlapping minimums and maximums), all the orders, and/or a formula describing the orders. It should also me recognized that although some embodiments are described as transmitting multiple second orders to a participant system of a liquidity taker other embodiments may transmit information from which such orders may be derived rather than the orders (e.g., a formula describing the orders). And, for an even further example, although some embodiments describe a central system determining second orders from a first order of a liquidity provider, in some embodiments, a liquidity provider participant system may determine such orders. Those second orders may be transmitted to a central system or to participant systems at liquidity takers.

The following sections I-XI provide a guide to interpreting the present application.

I. Terms

The term "product" means a machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise.

The term "variation" of an invention means an embodiment of the invention, unless expressly specified otherwise.

The term "indication" is used in an extremely broad sense. An "indication" of a thing should be understood to include anything that may be used to determine the thing.

An indication of a thing may include an electronic message that identifies the thing (e.g., an identification of a widget by a serial number affixed to the widget, an identification of a widget by one or more characteristics of the widget). An indication of a thing may include information that may be used to compute and/or look-up a thing (e.g., information identifying a machine of which a widget is a part that may be used to determine the widget). An indication of a thing may specify things that are related to the thing (e.g., characteristics of the thing, a name of the thing, a name of a thing related to the thing). An indication of a thing may not specify things that are related to the thing (e.g., a letter "a" may be an indication of a widget of a computer system that is configured to interpret the letter "a" to identify the widget). An indication of a thing may include a sign, a symptom, and/or a token of the thing. An indication, for example, may include a code, a reference, an example, a link, a signal, and/or an identifier. An indication of a thing may include information that represents, describes, and/or otherwise is associated with the thing.

A transformation of an indication of a thing may be an indication of the thing (e.g., an encrypted indication of a thing may be an indication of the thing). An indication of a thing may include the thing itself, a copy of the thing, and/or a portion of the thing. An indication of a thing may be meaningless to a thing that is not configured to understand the indication (e.g., a person may not understand that a letter "a" indicates a widget but it may nonetheless be an indication of the widget because the computer system may determine the widget from the letter "a"). It should be understood that the fact that an indication of a thing may be used to determine the thing does not mean that the thing or anything else is determined. An indication of a thing may include an indication of any number of the thing unless specified otherwise. An indication of a thing may include an indication of other things (e.g., an electronic message that indicates may things). (Indication can be used as a very broad term in claim language. For example: receiving an indication of a financial instrument.)

The term "represent" means (1) to serve to express, designate, stand for, or denote, as a word, symbol, or the like does; (2) to express or designate by some term, character, symbol, or the like; (3) to portray or depict or present the likeness of, as a picture does; or (4) to serve as a sign or symbol of.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may include or cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments may cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget, but may possibly include one or more other items as well.

The term "consisting of" and variations thereof mean "including and also limited to", unless expressly specified otherwise. Thus, for example, the sentence "the machine consists of a red widget and a blue widget" means the machine includes the red widget and the blue widget, but does not include anything else.

The term "compose" and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The terms "a", "an" and "the" refer to "one or more", unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the feature," then the phrase "the feature" should be understood to refer to the previously mentioned "a specific single feature." (It should be understood that the term "a" in "a specific single feature" refers to "one" specific single feature and not "one or more" specific single features.)

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". The phrase "based at least on" is equivalent to the phrase "based at least in part on". For example, the phrase "element A is calculated based on element B and element C" covers embodiments where element A is calculated as the product of B times C (in other words, A=B×C), embodiments where A is calculated as the sum of B plus C (in other words, A=B+C), embodiments where A is calculated as a product of B times C times D, embodiments where A is calculated as a sum of the square root of B plus C plus D times E, and so on.

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" modifies do not establish specific further limitations of the claim or otherwise restrict the meaning or scope of the claim.

The terms "e.g.", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers in the range, unless expressly specified otherwise. For example, the range "1 to 10" includes the integers from 1 to 10 (e.g., 1, 2, 3, 4, . . . 9, 10) and non-integers (e.g., 1.0031415926, 1.1, 1.2, . . . 1.9).

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), rendering into electronic format or digital representation, ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing, averaging and the like.

The term "determining" does not imply that mathematical processing must be performed, and does not imply that numerical methods must be used, and does not imply that an algorithm is used.

The term "determining" does not imply that any particular device must be used. For example, a computer need not necessarily perform the determining.

The term "determining" may include "calculating." The term "calculating" should be understood to include performing one or more calculations. Calculating may include computing, processing, and/or deriving. Calculating may be performed by a computing device. For example, calculating a thing may include applying an algorithm to data by a computer processor and generating the thing as an output of the processor.

The term "determining" may include "referencing." The term "referencing" should be understood to include making one or more reference, e.g., to a thing. Referencing may include querying, accessing, selecting, choosing, reading, and/or looking-up. The act of referencing may be performed by a computing device. For example, referencing a thing may include reading a memory location in which the thing is stored by a processor.

The term "determining" may include "receiving." For example, receiving a thing may include taking in the thing. In some embodiments, receiving may include acts performed to take in a thing, such as operating a network interface through which the thing is taken in. In some embodiments, receiving may be performed without acts performed to take in the thing, such as in a direct memory write or a hard wired circuit. Receiving a thing may include receiving a thing from a remote source that may have calculated the thing.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. In some embodiments, such a plurality of computer-based devices may operate together to perform one step of a process such as is common in grid computing systems. In some embodiments, such a plurality of computer-based devices may operate provide added functionality to one another so that the plurality may operate to perform one step of a process such as is common in cloud computing systems. (Conversely, a single computer-based device may be substituted with multiple computer-based devices operating in cooperation with one another. For example, a single computing device may be substituted with a server and a workstation in communication with one another over the internet) Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. Disclosed Examples and Terminology are not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. § 1.72(b).

The headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The disclosed invention is widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims that recite anything other than a statutory class shall be interpreted to recite purposes, benefits and possible uses of the claimed invention, and such preambles shall not be construed to limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued and canceled claims). In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries. Devices are in communication with one another if they are capable of at least one-way communication with one another. For example, a first device is in communication with a second device if the first device is capable of transmitting information to the second device. Similarly, the second device is in communication with the first device if the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

The term "compute" shall mean to determine using a processor in accordance with a software algorithm.

A "processor" means one or more microprocessors, central processing units (CPUs), computing devices, microcontrollers, digital signal processors, graphics processing units (GPUs) or like devices or any combination thereof, regardless of the architecture (e.g., chip-level multiprocessing or multi-core, RISC, CISC, Microprocessor without Interlocked Pipeline Stages, pipelining configuration, simultaneous multithreading, microprocessor with integrated graphics processing unit, GPGPU).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the method.

The apparatus that performs the process can include a plurality of computing devices that work together to perform the process. Some of the computing devices may work together to perform each step of a process, may work on separate steps of a process, may provide underlying services that other computing devices that may facilitate the performance of the process. Such computing devices may act under instruction of a centralized authority. In another embodiment, such computing devices may act without instruction of a centralized authority. Some examples of apparatus that may operate in some or all of these ways may include grid computer systems, cloud computer systems, peer-to-peer computer systems, computer systems configured to provide software as a service, and so on. For example, the apparatus may comprise a computer system that executes the bulk of its processing load on a remote server but outputs display information to and receives user input information from a local user computer, such as a computer system that executes VMware software.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any non-transitory medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), wireless local area network communication defined by the IEEE 802.11 specifications whether or not they are approved by the Wi-Fi Alliance, SAP, ATP, Bluetooth™, and TCP/IP, TDMA, CDMA, and 3G; and/or (iv) encrypted to ensure privacy or prevent fraud in any of a variety of ways well known in the art.

The term "database" refers to any electronically-stored collection of data that is stored in a retrievable format.

The term "data structure" refers to a database in a hardware machine such as a computer.

The term "network" means a series of points or nodes interconnected by communication paths. For example, a network can include a plurality of computers or communication devices interconnected by one or more wired and/or wireless communication paths. Networks can interconnect with other networks and contain subnetworks.

The term "predetermined" means determined beforehand, e.g., before a present time or a present action. For example, the phrase "displaying a predetermined value" means displaying a value that was determined before the act of displaying.

The term "transaction" means (1) an exchange or transfer of goods, services, or funds, or (2) a communicative action or activity involving two parties or things that reciprocally affect or influence each other.

Thus a description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel®, Pentium®, or Centrino™, Atom™ or Core™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back in to plaintext. An example of an asymmetric key algorithm is the RSA algorithm.

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112(f)

In a claim, a limitation of the claim which includes the phrase "means for" or the phrase "step for" means that 35 U.S.C. § 112(f) applies to that limitation.

In a claim, a limitation of the claim which does not include the phrase "means for" or the phrase "step for" means that 35 U.S.C. § 112(f) does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112(f), applies to that step(s).

With respect to a means or a step for performing a specified function in accordance with 35 U.S.C. § 112(f), the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112(f), structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application will be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference. Conversely, the definitions provided in this application should not be used to limit, define, or otherwise construe any term of any document incorporated herein by reference. The definitions set forth explicitly in this application are controlling notwithstanding the description of particular embodiments that may be incompatible with the definition(s).

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art refers to the prosecution history of the present application, but not to the prosecution history of any other patent or patent application, regardless of whether there are other patent applications that are considered related to the present application, and regardless of whether there are other patent applications that share a claim of priority with the present application.

The invention claimed is:

1. A system comprising:
   at least one memory;
   at least one processor, coupled to the at least one memory, configured to:
   receive market data regarding a financial instrument via a first network link;
   receive, via the first network link, from a first participant system of a liquidity provider, an aggression level;
   in response to receiving the aggression level, store the aggression level in the least one memory for use in determining prices;
   receive, via the first network link, from the first participant system, a first order, the first order including at least one of an order to sell the financial instrument and an order to buy the financial instrument at a market price, and in which contra order is for an opposite side of the first order, wherein the market price includes manipulative trading risk;
   in response to receiving the first order, determine a plurality of second orders based on the first order, the aggression level and the market data, in which the plurality of second orders include a ladder of orders each with different quantities and different price deviations from a market price such that a price deviation from the market price increases in favor of the liquidity provider as a quantity increases;
   in response to determining the plurality of second orders, transmit the plurality of second orders to a plurality of participant systems of a plurality of liquidity takers;
   receive, via a second network link, from a second participant system of the plurality of participant systems of the plurality of liquidity takers, a contra order;
   transmit the contra order received from the second participant system, via the second network link, to the first participant system;
   receive, via the second network link, from the first participant system, an indication that a third quantity of the financial instrument is reserved in a first order management system; and
   in response to receiving the indication that the third quantity of the financial instrument is reserved, facilitate execution of an exchange that fulfills at least a part of each of the contra order and a single second order of the plurality of second orders that the liquidity taker is qualified to view.

2. The system of claim 1, in which the first order includes at least one of an order to sell the financial instrument and an order to buy the financial instrument at the market price, and in which contra order is for an opposite side of the first order.

3. The system of claim 1, in which the manipulative trading risk represents the market price that includes a midpoint of a bid and ask quotes to be transitorily away from market's equilibrium price through trading actions.

4. The system of claim 1, in which the aggression level includes a numerical identifier expressing a percentage of an expected market impact cost that a given liquidity taker pays as a liquidity premium for the execution.

5. The system of claim 4, in which market impact cost is determined based on historical data and market volatility.

6. The system of claim 1, in which the first participant system and the first order management system store trading intentions of the liquidity provider securely.

7. The system of claim 1, in which the first participant system communicates with the first order management system through an API of the first order management system.

8. The system of claim 1, in which the market data includes information about volatility of the financial instrument.

9. The system of claim 1, in which the financial instrument includes at least one of a stock and a bond.

10. The system of claim 1, in which the contra order and the single second order are matched based on a time priority because the contra order is received by a central system before at least one second contra order form at least one second liquidity taker of the plurality of liquidity takers.

11. The system of claim 1, in which receiving the indication that the third quantity of the financial instrument is reserved in a second order management system by a central system include receiving the contra order as a firm order from the liquidity taker for matching.

12. The system of claim 1, in which the second participant system and a second order management system securely store trading intentions of a liquidity trader as a dark pool of liquidity.

13. The system of claim 1, in which the second participant system is configured to maintain secrecy of the second orders of the plurality of second orders other than the single second order.

* * * * *